March 26, 1935. K. T. POTTHOFF 1,996,031
APPARATUS FOR TREATING MATERIAL
Original Filed May 26, 1927 16 Sheets-Sheet 1

March 26, 1935. K. T. POTTHOFF 1,996,031
APPARATUS FOR TREATING MATERIAL
Original Filed May 26, 1927 16 Sheets-Sheet 2

INVENTOR
Kurt T. Potthoff
BY Edwards, Sager + Bower
ATTORNEYS

March 26, 1935. K. T. POTTHOFF 1,996,031
APPARATUS FOR TREATING MATERIAL
Original Filed May 26, 1927 16 Sheets-Sheet 11

Inventor
Kurt T. Potthoff
By his Attorneys
Edwards, Sager and Bower.

March 26, 1935.  K. T. POTTHOFF  1,996,031
APPARATUS FOR TREATING MATERIAL
Original Filed May 26, 1927  16 Sheets-Sheet 14

Inventor
Kurt T. Potthoff
By his Attorneys
Edwards, Lager and Bower.

March 26, 1935. K. T. POTTHOFF 1,996,031
APPARATUS FOR TREATING MATERIAL
Original Filed May 26, 1927  16 Sheets-Sheet 16

Patented Mar. 26, 1935

1,996,031

UNITED STATES PATENT OFFICE 1,996,031

APPARATUS FOR TREATING MATERIAL

Kurt Theodore Potthoff, Brooklyn, N. Y., assignor to U. S. Galvanizing & Plating Equipment Corporation, a corporation of West Virginia Application May 26, 1927, Serial No. 194,305
Renewed January 9, 1932

17 Claims. (Cl. 214—17)

This invention relates to apparatus for treating articles and particularly to treating articles by passing them through a series of fluids in successive tanks.

The object of the invention is to provide apparatus which will automatically carry the articles through a series of tanks receiving them at one end, lifting them from one tank to the other in succession, and delivering them at the other end for unloading.

A further object of the invention is to provide apparatus which will transfer a number of separately supported articles together through the same treating means.

Further objects of the invention particularly in the provision of apparatus adapted to convey the articles by means of a series of transverse carrier bars will appear from the following description taken in connection with the accompanying drawings, in which Figs. 1, 2 and 3 are outline side elevations of successive portions of the apparatus.

Figure 1:
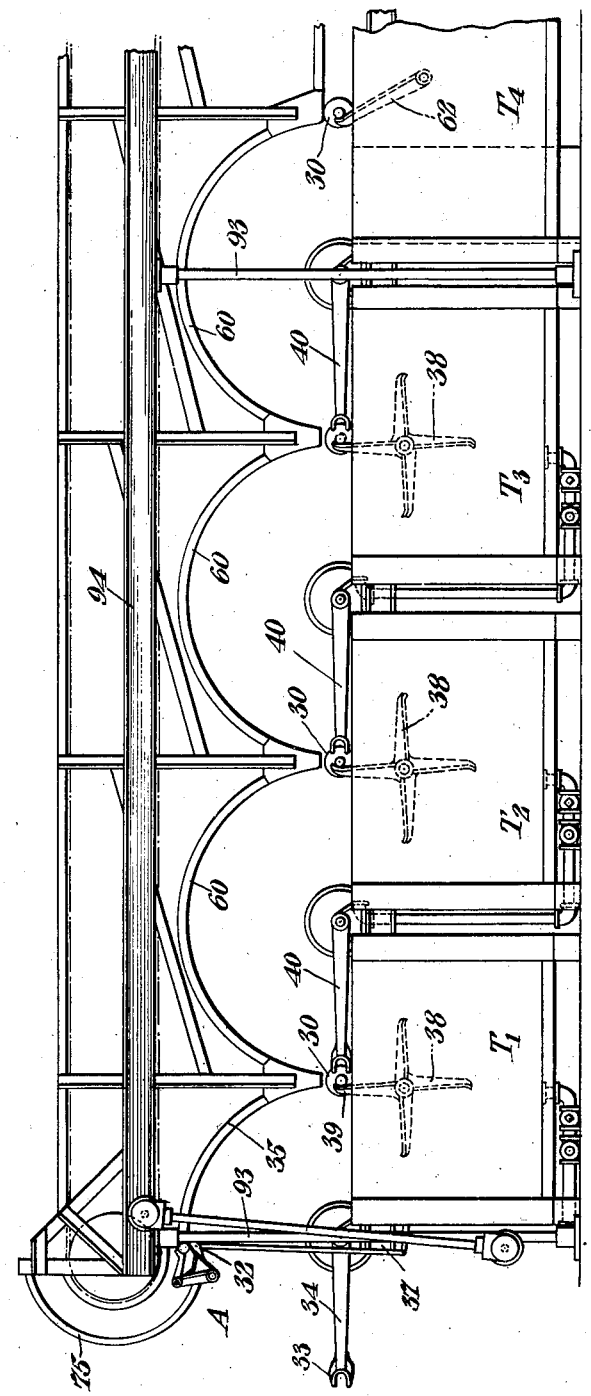
Figure 3:
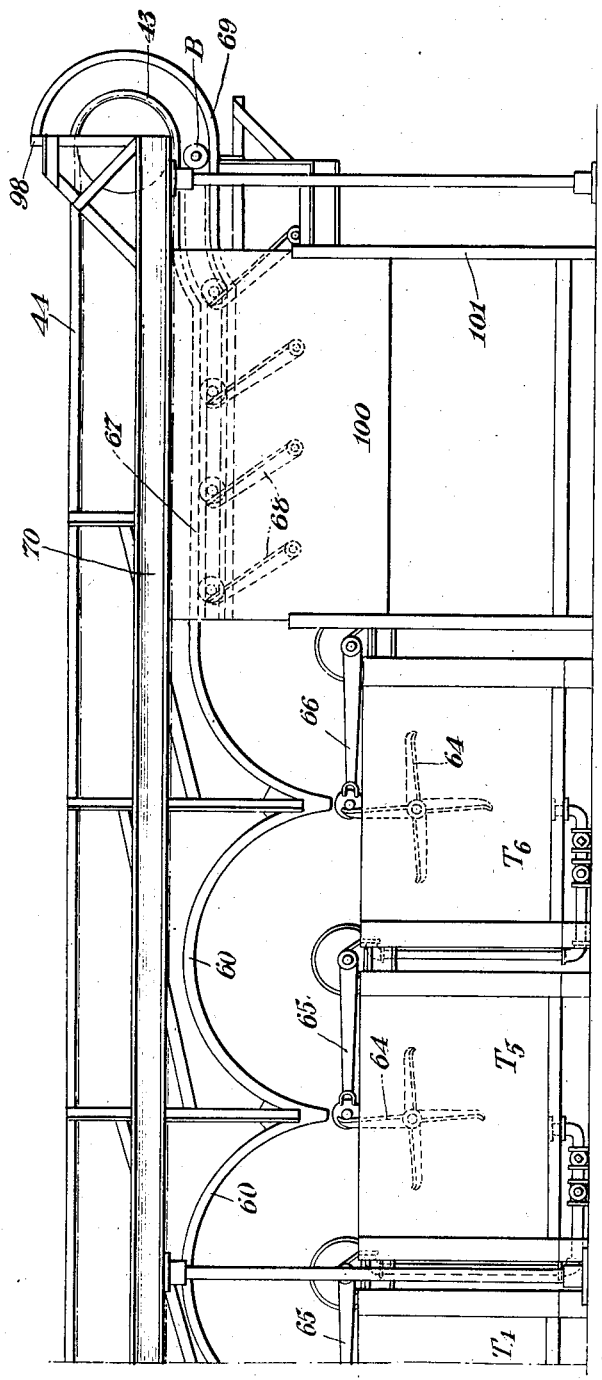
Figure 4:
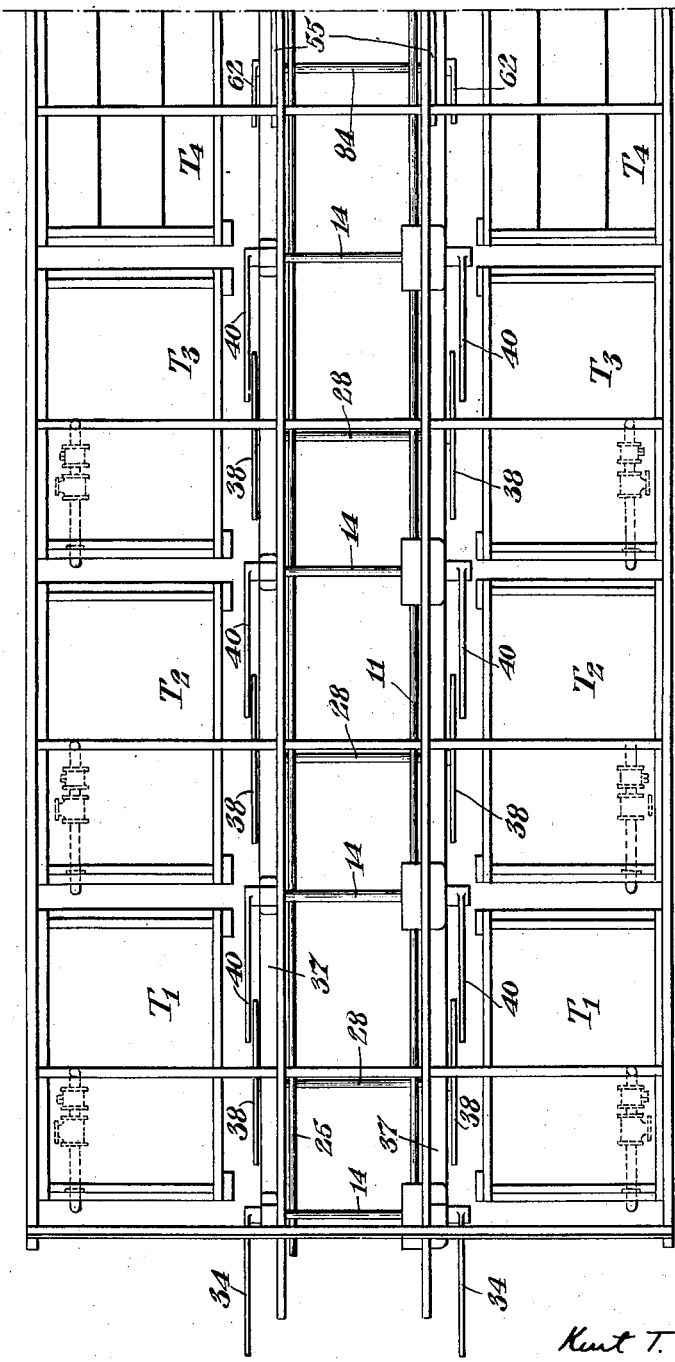
Figs. 4, 5 and 6 are outline plan views corresponding respectively to Figs. 1, 2 and 3.
Figure 5:
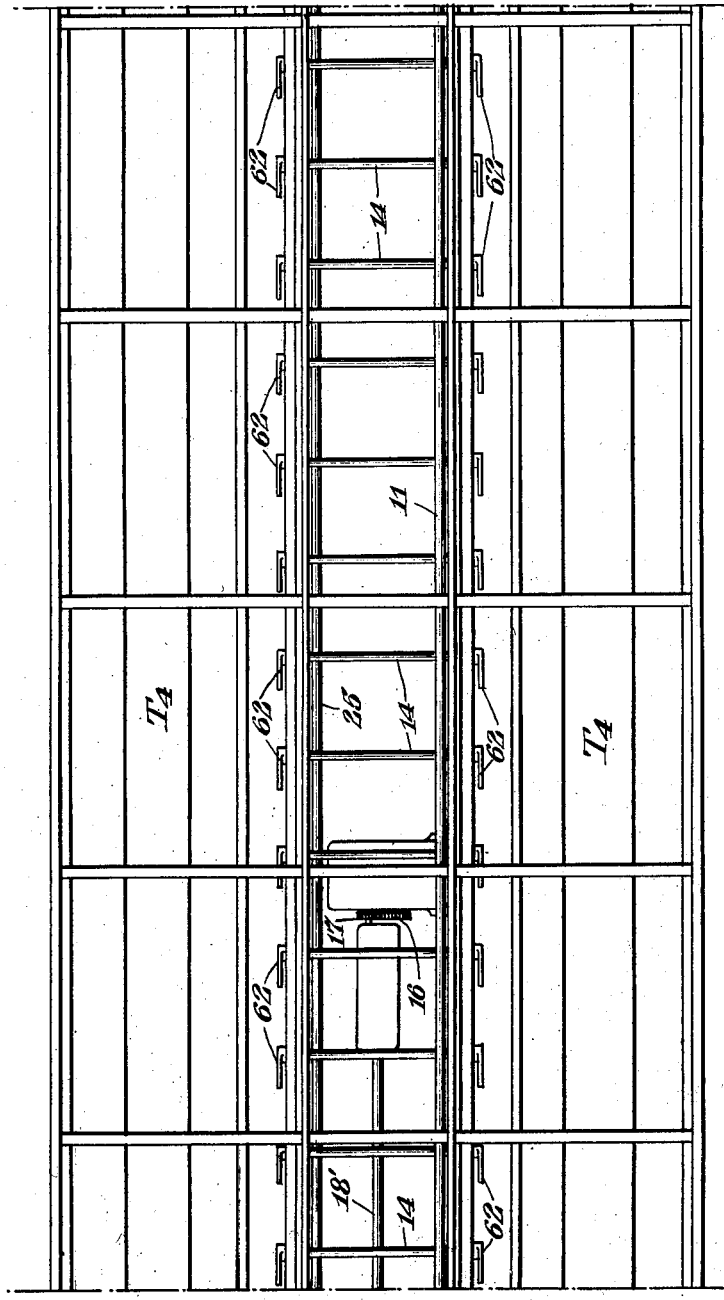
Figure 6:
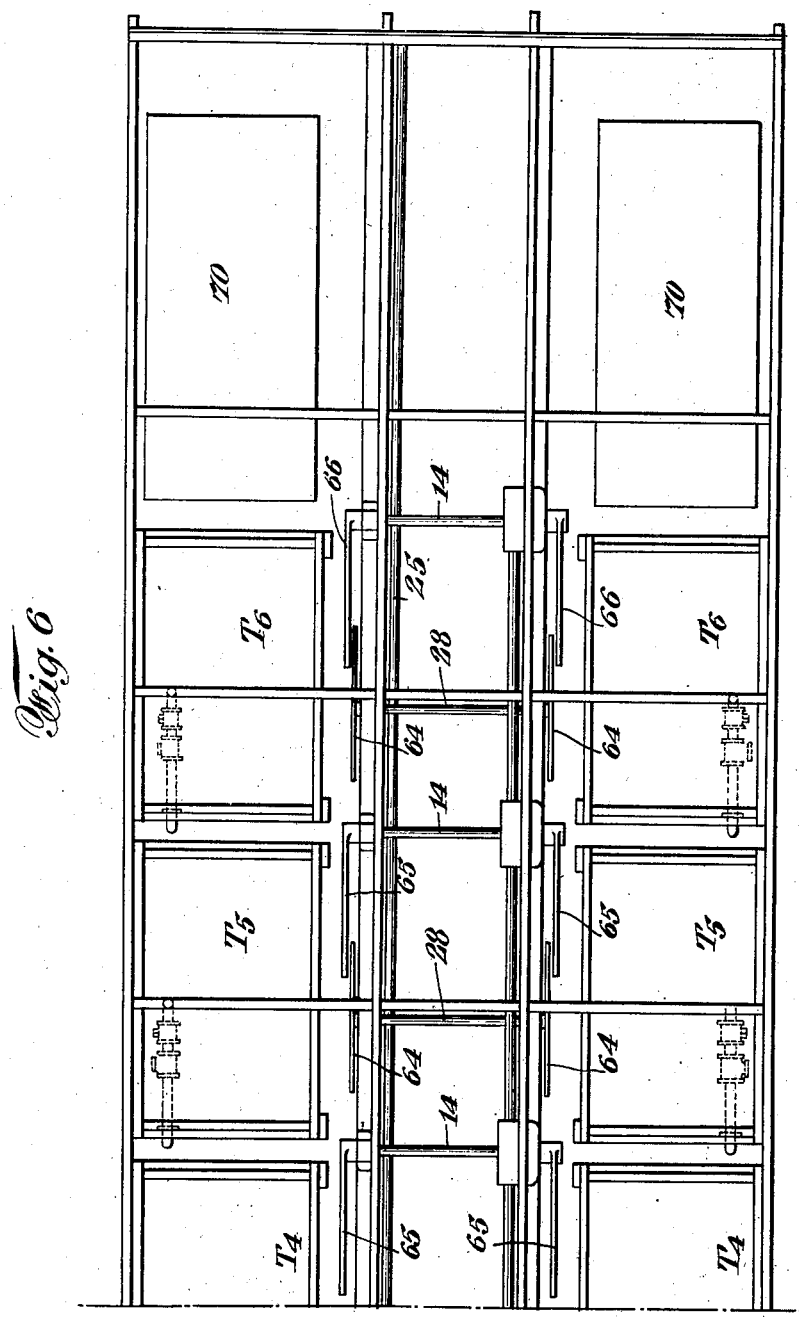
Figure 7:
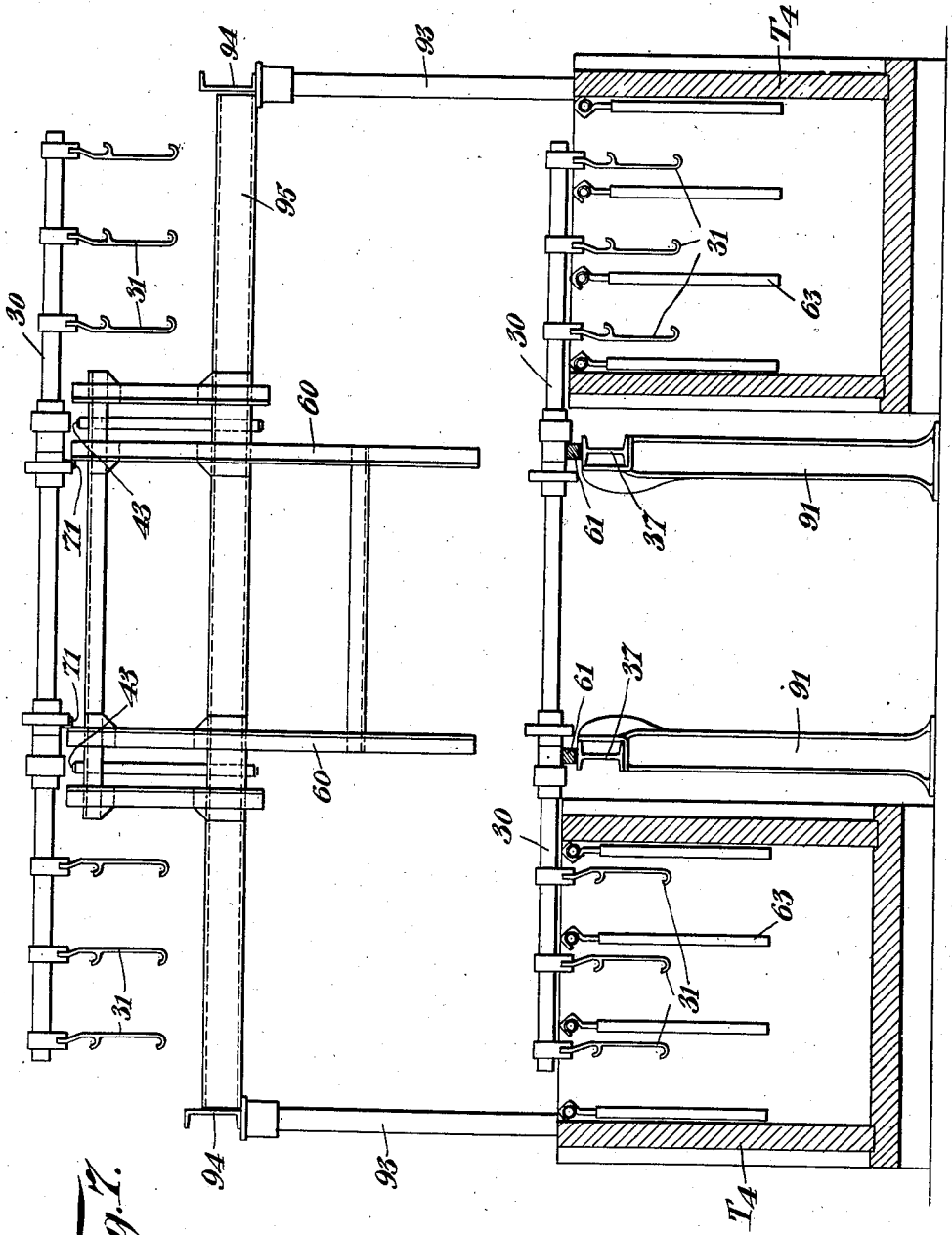
Fig. 7 is a vertical sectional view of the apparatus.

In the embodiment of the invention shown in the drawings (see Fig. 7) the articles to be treated are carried by transverse bars 30. Each bar 30 extends across the apparatus from side to side engaging transfer mechanism at its central portion and having its ends provided with article carrying means. In the example shown, each end of each bar rigidly carries a plurality of depending hook portions 31 to bear the articles directly or to carry trays containing the articles. The articles thus hang suspended from the bar at each end and by transferring the bar through the apparatus a large number of articles are carried through the fluids in the successive tanks. The articles are loaded on the bars at one end of the apparatus, the left end of Fig. 1, and unloaded at the other end, the right end of Fig. 3, and the operations between loading and unloading are entirely automatic.

Figure 8:
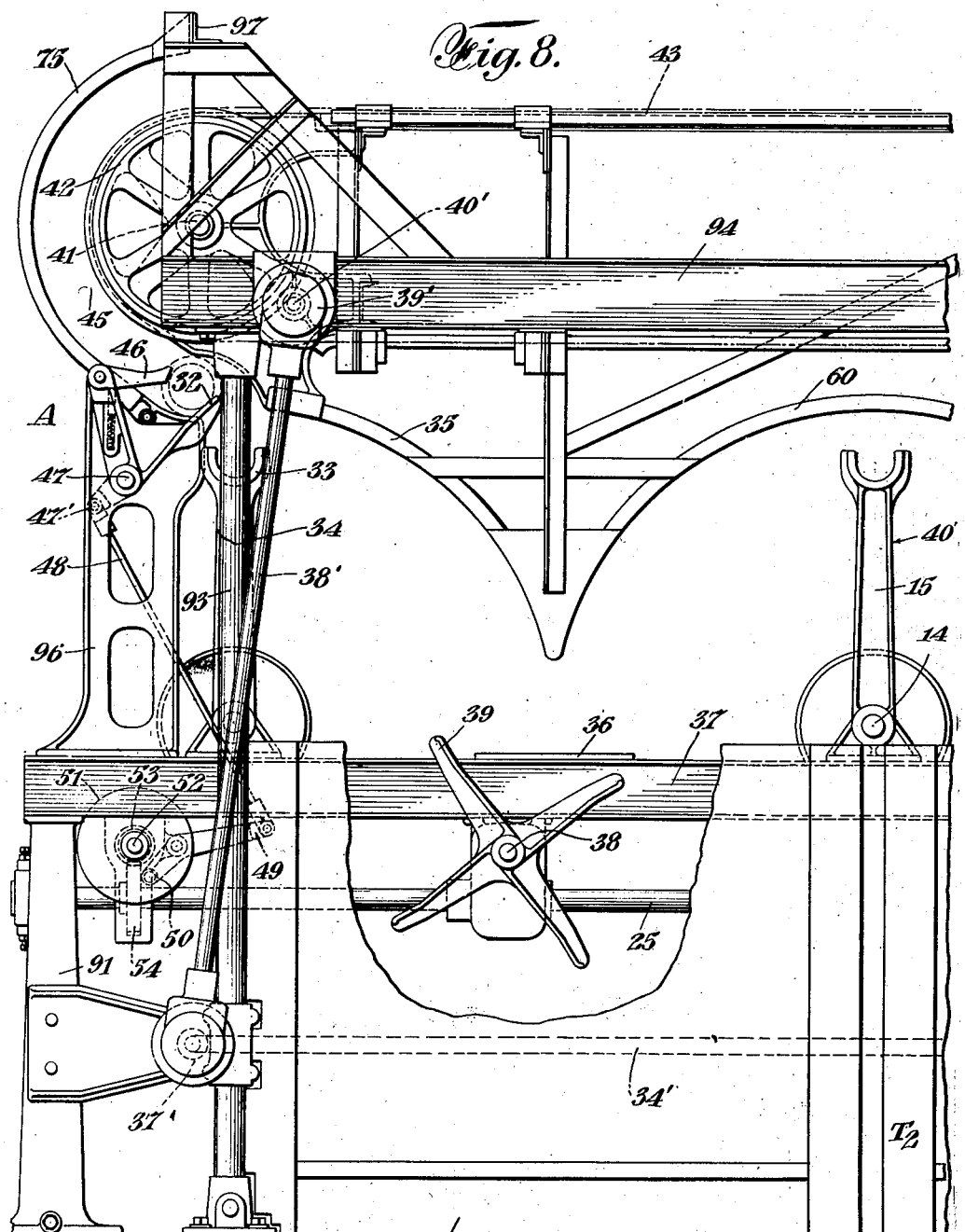
Fig. 8 is a side elevation of the loading end of the machine.

Starting with the bar in loading position A, (Fig. 8) held by the latch member 32 a desired length of time, the operator places the articles on each end of the bar, and the latch 32 automatically turns clockwise to deposit the bar in the fork ends 33 of transfer arms 34 at each side of the central portion of the bar. The transfer arms 34 are in stationary vertical position to receive the bar and then move clockwise (Fig. 8) to carry the bar downward along quadrants 35 and deposit it on the slide supports 36 with the articles submerged carried by I beams 37 with the articles submerged in the liquid in the first treating tank T₁. The transfer arms 34 stop in this position on each side while the four arm spiders 38 on each side rotate clockwise to bring an arm 39 of each into engagement with the bar and push it to the right out of the fork end 33 of the arm 34 which is thus free to return for another bar.

The rotation of the four arm spider stops so that the bar resting on slider 36 is in approximately central position on the tank and with the suspended articles in the liquid in the first tank T₁ on each side. The second set of transfer arms 40 have meanwhile rotated clockwise to horizontal position pointing toward the left and with their forked ends in position to receive the bar pushed along the slider 36 by the arms 39 as the spiders 38 resume their movement. In this way the bar is delivered to the transfer arms 40 which then rotate clockwise 180° (Fig. 8) to carry the bar upward and downward under semicircles 60 and lift the articles out of tank T₁ and lower them into the next tank T₂. The drive of the transfer arms provides for a pause when these arms are in a vertical position (Fig. 8) to receive the loaded bar and to drain the articles between the tanks.

The arms 40 deposit the bar on the supporting slide for tank T₂ and the second set of four arm spiders remove the bar from said transfer arms to a central position and then pass it on to the next set of transfer arms 40, which in turn lift and lower the bar into the next tank T₃. In this way the articles are automatically carried through any desired number of tanks. Three tanks T₁, T₂, and T₃ are shown in the drawings containing for instance an acid dip, a wash and a neutralizer, though it is obvious that any desired number of tanks and any desired treating fluids could be used.

Figure 2:
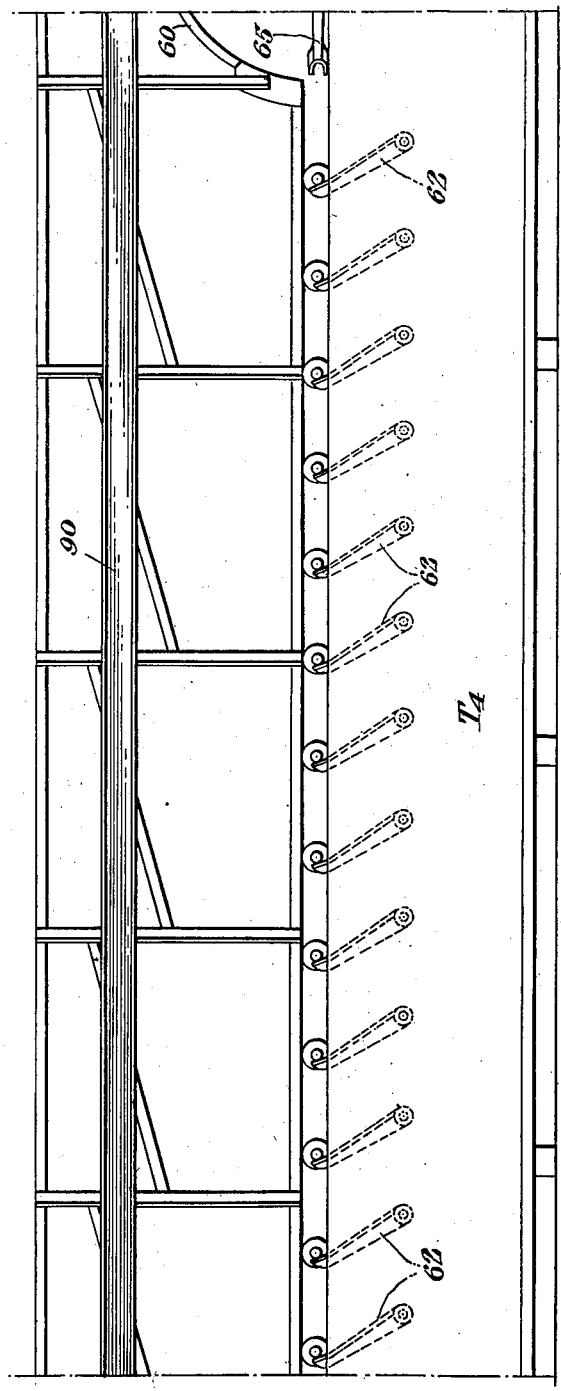

In the apparatus shown in the drawings the treatment tanks $T_1$, $T_2$ and $T_3$ are preparatory for electroplating the articles in tank $T_4$. The bar carrying the article is transferred from tank $T_3$ to tank $T_4$ by the third transfer arm 40 in the manner above described in connection with the first transfer arm, the bar resting on cathode tracks 61 (Fig. 7) extending along the plating tank $T_4$. Any desired means is provided to slide the bar along said tracks from one end of the tank $T_4$ to the other. In the machine shown in Fig. 2 this means comprises a series of rotating arms 62, the first arm engaging the bar to remove it from the transfer arm 40 and slide it within reach of the next arm 62. Then each arm 62 slides the bar into the path of rotation of the next succeeding arm, and thus the bar with the articles it carries is transferred step by step along the tank $T_4$. While passing through the tank $T_4$ the articles are immersed within an electrolyte (Fig. 7) and are plated by current passing from the anodes 63 through the electrolyte to the articles and thence through the bar parts 30, 31 to the cathode tracks 61.

At the end of the tank $T_4$ the last arm 62 leaves the bar to be picked up by the four arm spider 64 and pushed into the fork end of the transfer arm 65 which transfers the bar from the tank $T_4$ to the cold rinse tank $T_5$ (Fig. 3) as above pointed out in connection with transfer arms 40. At tank $T_5$ another four arm spider 64 slides the bar to another transfer arm 65 acting to move the bar and articles from tank $T_5$ to the hot rinse tank $T_6$. At tank $T_6$ the bar is moved into the fork end of a transfer arm 66 by another four arm spider 64 and this arm 66 carries the bar upward to tracks 67 in a drier chamber. The bar is pushed along these tracks to carry the articles through the drier 70 by a series of rotatable arms 68 similar to the arms 62 of tank $T_4$, and the last arm 68 delivers the bar to the unloading position B on track 69 where the bar remains temporarily while a workman removes the finished and dried articles from the bar.

Each bar thus unloaded is engaged by pawls 43' of conveyor chains 43 and carried back along tracks 44 to the entrance or loading end of the machine. This overhead conveyor chain 43 runs continuously at a speed so timed that as one bar is delivered at the loading station A another bar is picked up at the unloading station B. The bar at the loading station A remains in position for loading a desired length of time and the bar at the unloading station B remains idle for a similar period for unloading.

Figure 9:
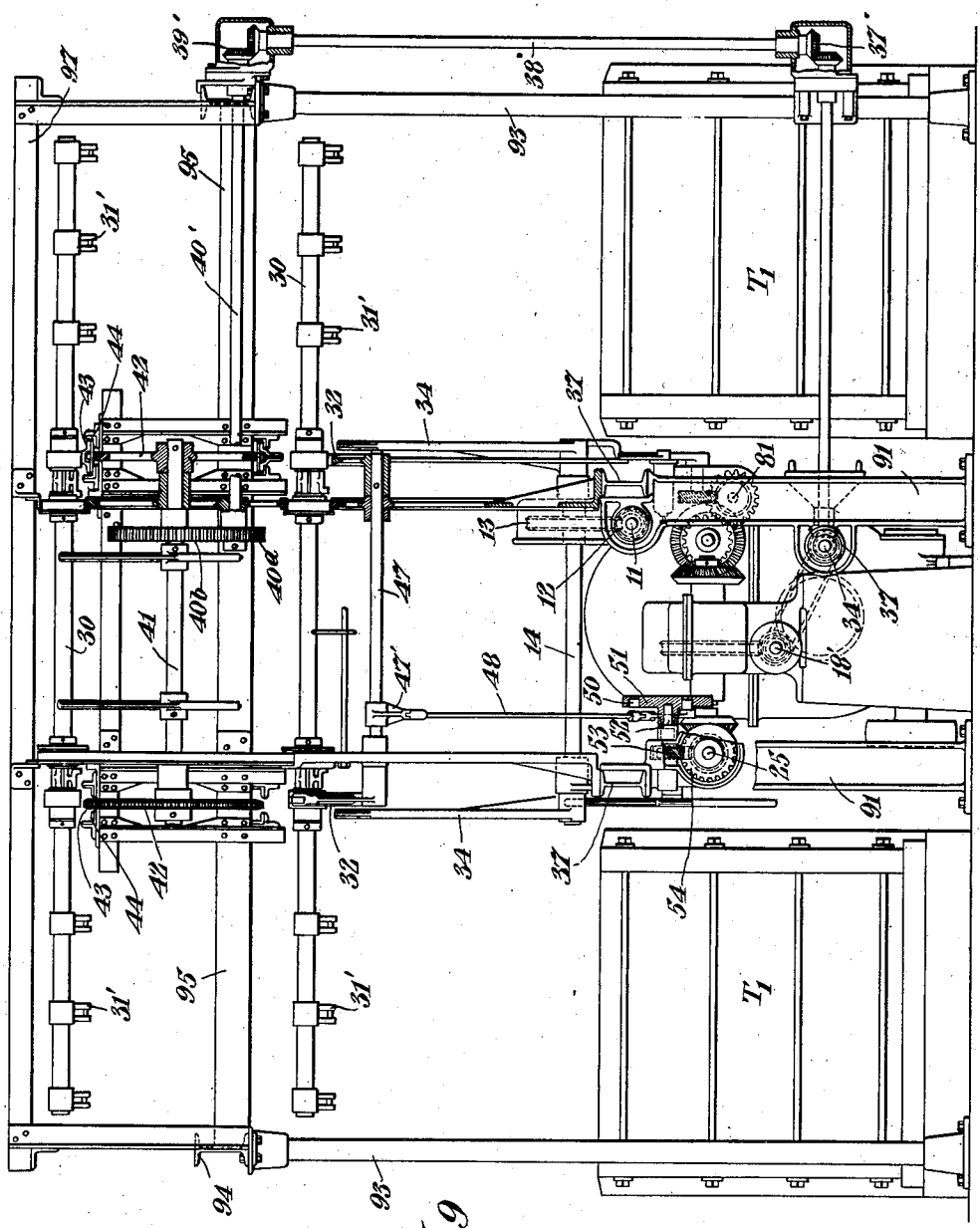
Fig. 9 is an end elevation of the loading end.
Figure 10:
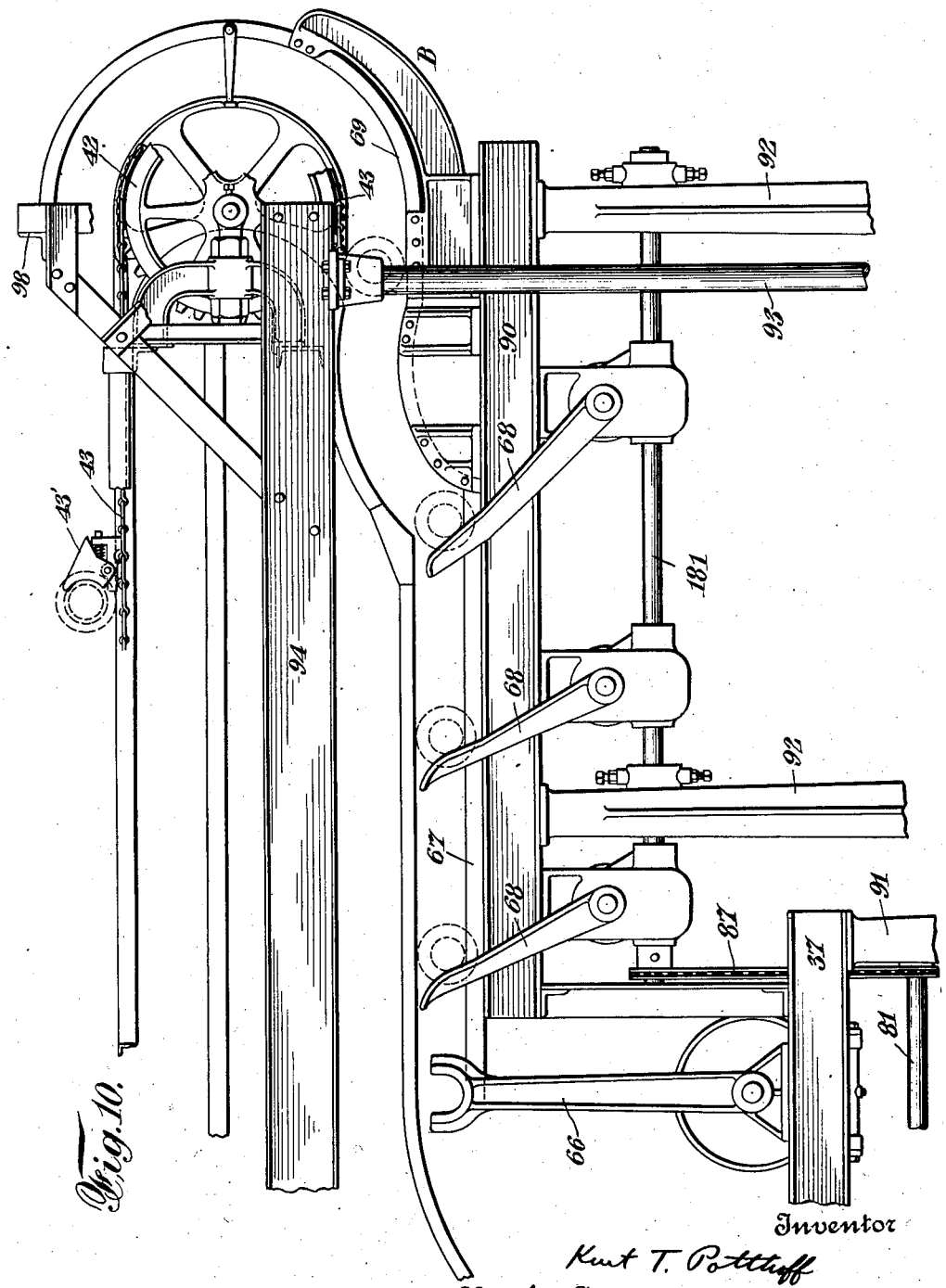
Fig. 10 is a side elevation of the conveying mechanism in the drier and at the unloading end of the machine.
Figure 13:
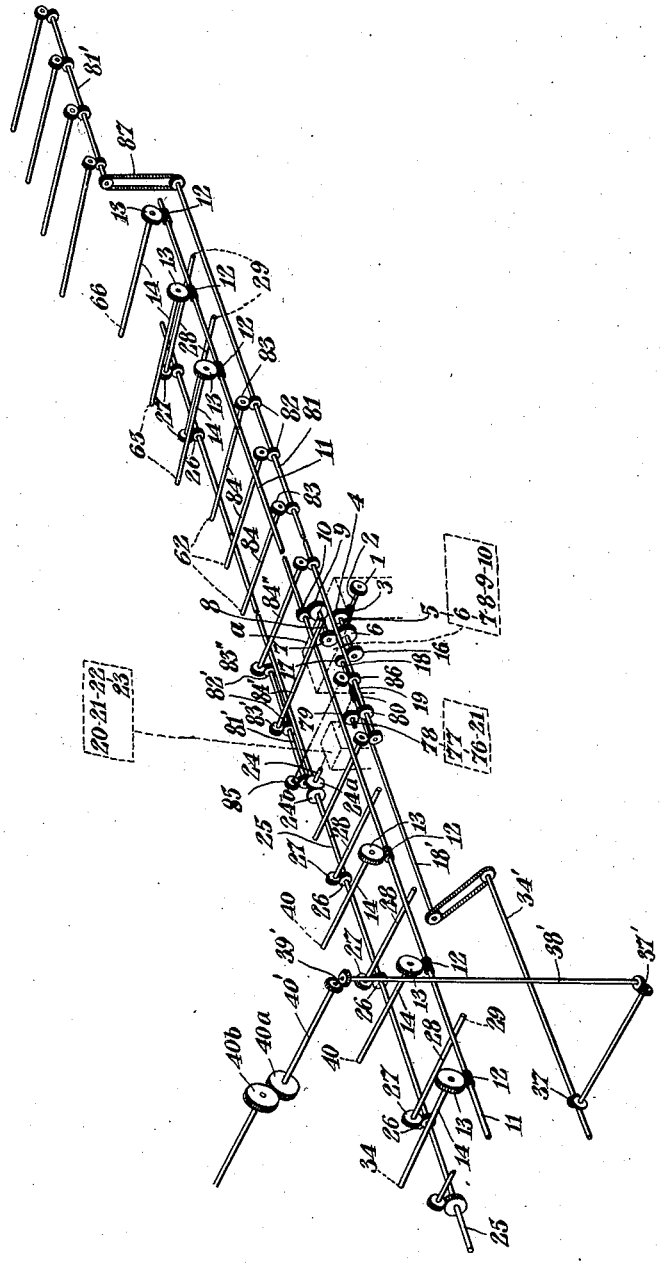
Fig. 13 is a diagrammatic layout of the drive.

This conveyor chain 43 is driven (Figs. 8, 9 and 13) from the continuously rotating shaft 34' at the loading end through sets of bevel gears 37', shaft 38' bevel gears 39' and cross shaft 40' carrying a spur gear 40ª meshing with spur gear 40ᵇ on the drive shaft 41 of the chain. This drive shaft 41 carries sprocket wheels 42 meshing with the conveyor chains 43 and moving said chains to return the rack carrying bars 30 to the loading end of the machine. During this return journey the bars 30 are engaged by pawls 43' of chains 43 and are pushed along and guided by tracks 71 (Fig. 7) between the chains. On shaft 41 at the loading end are also mounted finger sprockets 45 having their fingers placed slightly ahead of the pawls 43' so that as the pawls 43' turn into the horizontal and the bar slips outward against semi-circular tracks 75, it will be received by these fingers and lowered along said tracks to cushion levers 46, and below the ends of the pawls 43' passing around under sprockets 42 and back toward the unloading end of the machine. The bar engaging portions of these pawls are resiliently mounted as shown to yield toward the chain in case there is any engagement between the bar and the pawl at the time that the pawl is leaving the bar at the loading station. The fingers of sprockets 45 being of course in front simply leave the bar when it is picked up by the cushion levers 46 and passed on down to the loading latches 32.

These loading latches 32 are fastened on a pivoted cross bar 47 in the end frame and have their releasing movement controlled by an arm 47' and rod 48 and cam lever 49 with its roller running in a properly shaped cam groove 50 of cam wheel 51. For each revolution of the cam 51 the loading latches are tipped clockwise (Fig. 8) to release the bar and place it in the forks 33 of transfer arms 34. The cam 51 rotates with shaft 52 driven by spiral gear 53 meshing with a spiral gear 54 on the four arm spider drive shaft 25, so that the tripping of latch 32 works in unison with the four arm spider drive which in turn is driven from a central drive common to all the driven elements.

Figure 14:
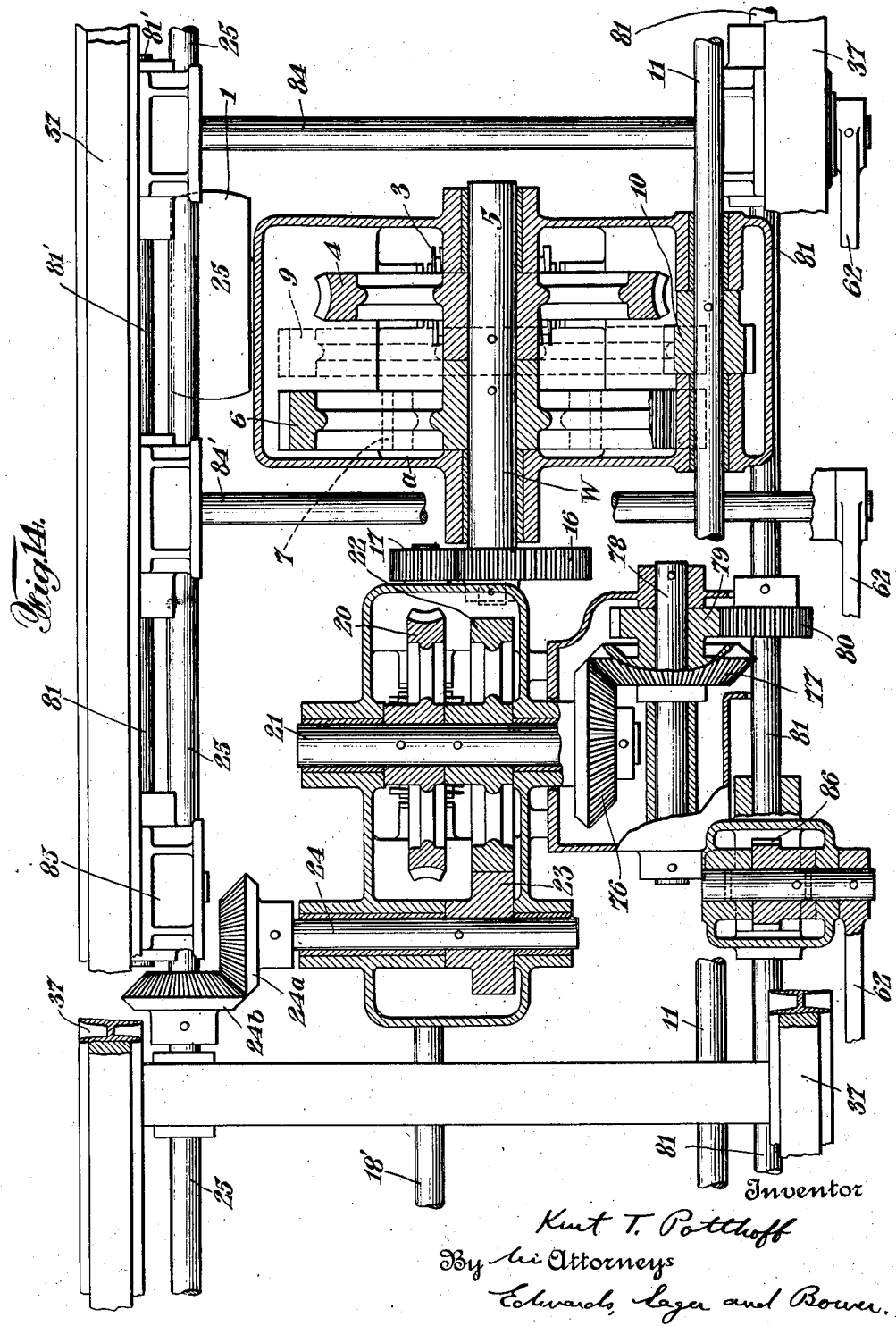
Fig. 14 is a plan view of a portion of the driving mechanism with parts in section.
Figure 15:
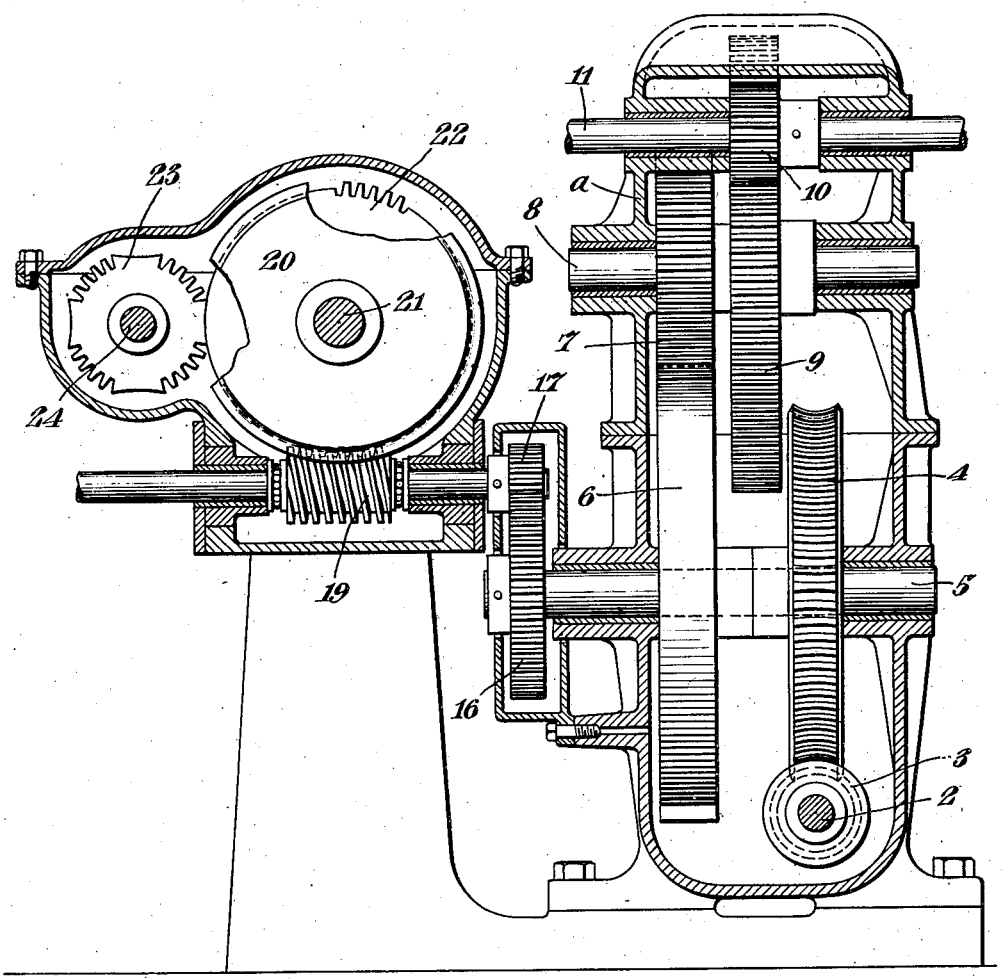
Fig. 15 is a vertical sectional view of a portion of the driving mechanism.
Figure 16:
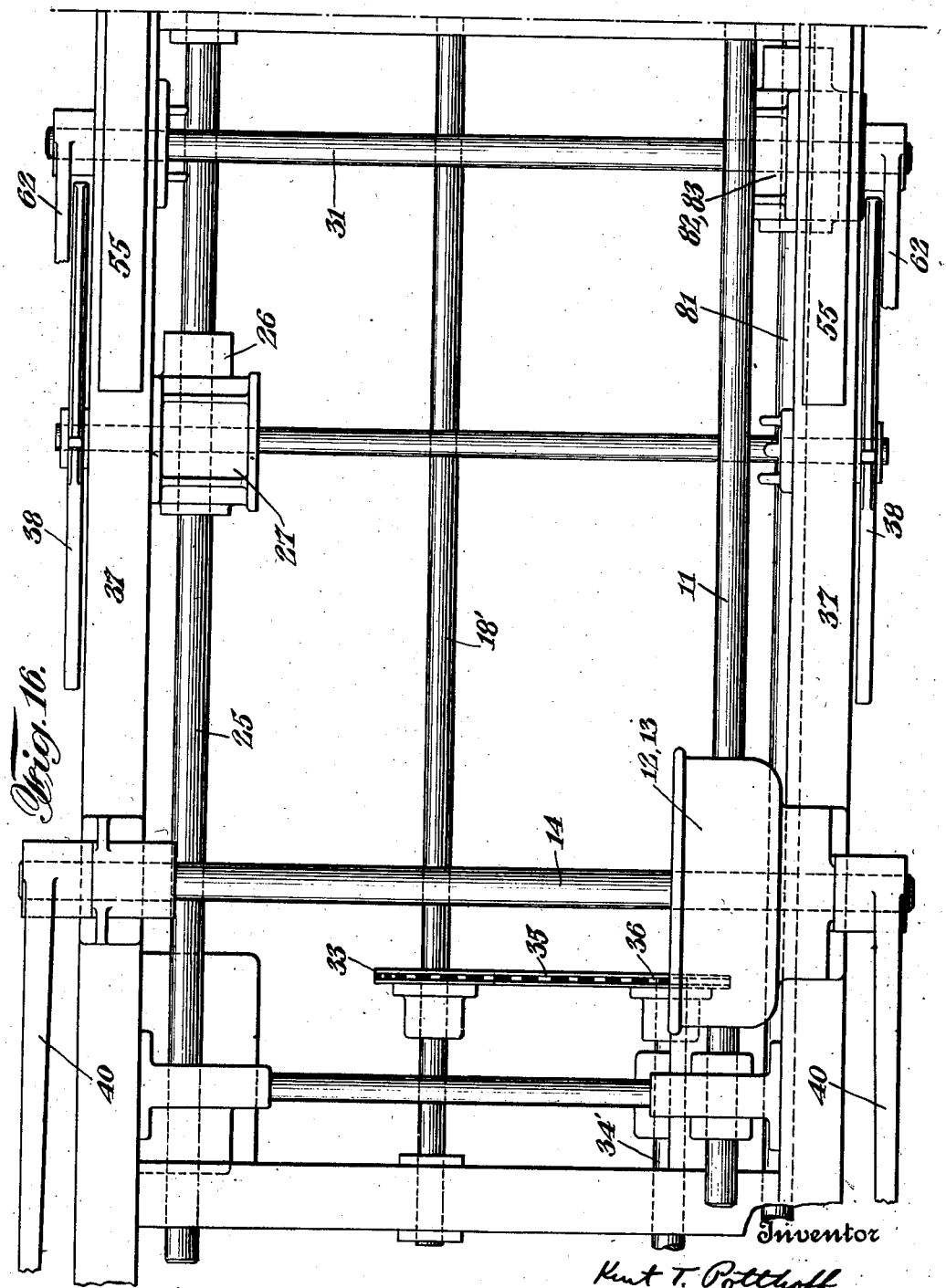
Fig. 16 is a plan view of a portion of the drive.
Figure 17:
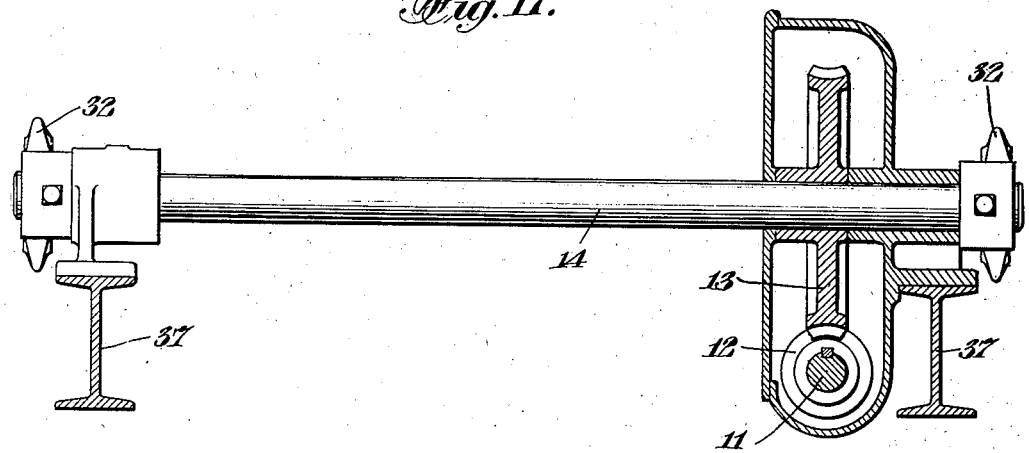
Fig. 17 is a vertical sectional view of a part of the drive for the transfer arms.
Figure 18:
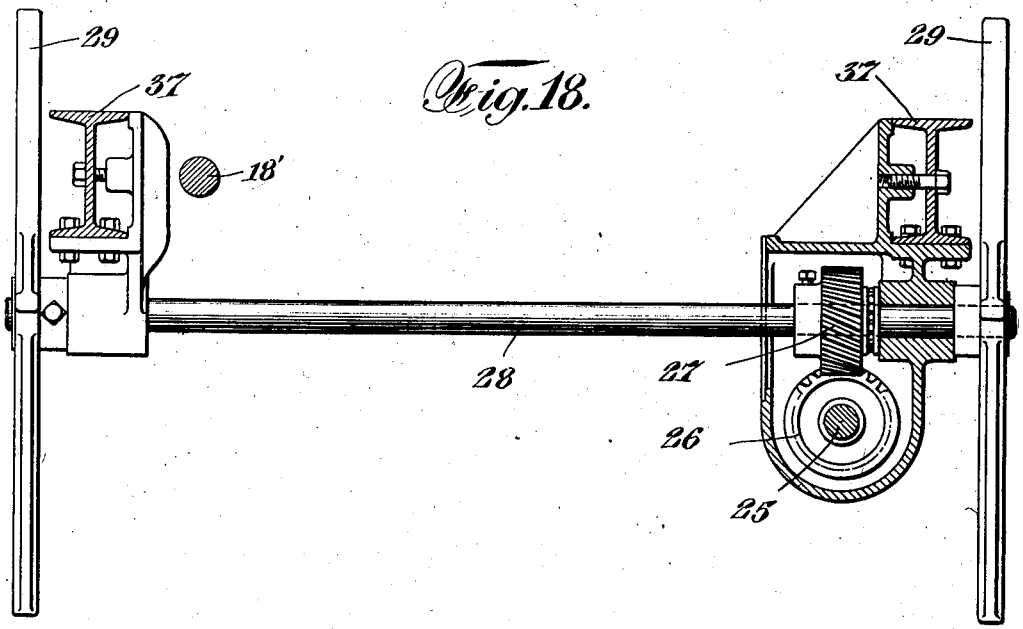
Fig. 18 is a similar view of a part of the drive for the four arm spiders.

This central or main drive has a belt driven pulley 1 (Figs. 13 and 14) on shaft 2 (Fig. 15). This shaft carries a worm 3 meshing with a worm wheel 4 on shaft 5 having mounted thereon a single station intermittent gear 6 engaged with its corresponding gear 7 on shaft 8. Also on shaft 8 is a spur gear 9 meshing with a gear 10 carried on shaft 11 of the transfer arm drive. This shaft extends from the main drive casing in both directions and has mounted at intervals worms 12, meshing with worm wheels 13 carried on cross shafts 14 on the ends of which transfer arms 34, 40, 65 and 66 are mounted. The transfer arms are revolved clockwise 90° from Fig. 1 position and then stopped for a period of time to receive a rack carrying bar at A, then rotated 90° and stopped again to have the rack carrying bar removed by the four arm spider.

The drive for the four arm spiders branches off from the main drive where the spur gear 16 (Figs. 13 and 14) on continuously rotating shaft 5 drives the spur gear 17 on shaft 18. On shaft 18 (Fig. 15) is a worm 19 engaging a worm wheel 20 on shaft 21 which also carries an intermittent gear 22 co-acting with four station intermittent gear 23 on shaft 24. Shaft 24 extends across the machine and carries on its end a bevel gear 24ª meshing with a corresponding bevel gear 24ᵇ to drive shaft 25. On shaft 25, intermediate the transfer arms, are mounted spiral gears 26 meshing with spiral gears 27 carried on cross shafts 28 on the ends of which are mounted the four arm spiders 29. These spiders move the rack from one transfer arm to the next transfer arm. They are so timed through gearing and intermittent gearing so as to make but one quarter revolution for every full revolution, or four cycles of the transfer arm and between each quarter movement the spiders stop with their uppermost arms substantially vertical and the bars 30 in mid position over the corresponding tanks.

Shaft 21 of the four arm spider drive is continuously rotating and is extended across the machine and carries a bevel gear 76 (Fig. 14) meshing with a second bevel gear 77 mounted on an auxiliary shaft 78 on which is a spur gear 79 meshing with a spur gear 80 on continuously rotating drive shaft 81 for the single arm spiders. On shaft 81 spiral gears 82 meshing with spiral gears 83 carried on cross shafts 84 on the ends of which are mounted the single arm spiders 62, the cross shaft 84' being driven from the other side of the machine through gears 82', 83 from countershaft 81' driven in turn by gears 82'', 83'' from shaft 84''. One pair of single arm spiders do not have a cross shaft 84, the spider on one side being driven from countershaft 81' at 85 while the companion spider on the other is driven from the shaft 81 at 86. This leaves a space at the center for the central driving mechanism as shown, Fig. 14.

At its end the shaft 81 is connected by chain 87 to a shaft 181 which is at a higher level and drives the single arm spiders 68 at the discharge end of the machine. All of these single arm spiders rotate continuously.

The shaft 34 (Fig. 13) of the overhead chain drive is driven by chain 8 from an extension 18' of the continuously rotating shaft 18, (Fig. 15).

Thus while the single arm spiders 62, 68 and the conveyor chains 43 move continuously the remainder of the transfer mechanisms have a coordinated intermittent motion. The time that it takes the chains 43 to return the bar 30 from the unloading station B to the loading station A is the time that the bar at the loading station A remains idle so that the operator may load the same with work. At the unloading station B each bar 30 is delivered immediately after one has been picked up, and it remains in unloading position for a period of time corresponding to the loading time at station A. The transfer arms 34, 40, 65, 66 move in unison and have an intermittent motion stopping every 90° and with the time of motion and rest the same, or in any desired relative proportion. The four arm spiders 62, 68 also stop every 90° with their uppermost arms substantially vertical and this stop is during the movement of the transfer arms from horizontal downward and back to horizontal again.

The work is treated for substantially the same length of time in tanks $T_1$, $T_2$, $T_3$, $T_5$ and $T_6$, while the relative lengths of time of treatment in the tank $T_4$ and drier are determined by the lengths of these members or the rate of travel of the bars through them. For instance fewer longer arms 62 or 68 will speed up the travel of the bars 30 along tank $T_4$ or through the drier and correspondingly shorten the duration of the treatment while delivering the bars at the same intervals. Or instead of the rotating arms 62, 68 chain conveyors, similar to chains 43, may be provided and these may have variable speed connections to the remaining conveying means.

In the apparatus of this invention the driving mechanism is in the central space between the rows of tanks, and the tanks and work are at all times freely accessible. A single conveying means is used for a large number of work racks or units and the amount of work may be varied as desired at the loading end. The carrier bar 30 may be unloaded at the discharge end B, as described, or the work may be left on the bar and carried back to the loading end to be unloaded there. Where the work is to be carried back to the loading end, and where the racks or baskets hang down far below the bars 30 the level of the return will be raised so that the work hanging from the bars will clear the frame structure, the chain sprockets being increased in diameter and the drive ratio correspondingly modified to maintain the proper time of pick up and return.

As shown in the drawings the central drive mechanism is supported from the floor and from the I beam members 37 for the tank portion and I beam members 90 for the drier and discharge portion, set on pedestals 91, 92 at desired intervals. The upper frame work carrying the arcuate bar guides and the return mechanism is supported at the sides by columns 93 and under the I beams 94 connected by cross members 95. This entire frame work is thus supported separately from the tanks suspending the guide parts above the tanks and providing a clearance for the passing of the bars underneath this frame work in one direction and above the frame work in the other direction so as to make a complete closed circuit. At the loading end of the machine the tracks 75 and tripping mechanism are supported by upper pedestals 96 from I beams 37 and the upper ends of the tracks or guides 75 are attached to a cross member 97 carried by the upper frame work.

Figure 11:
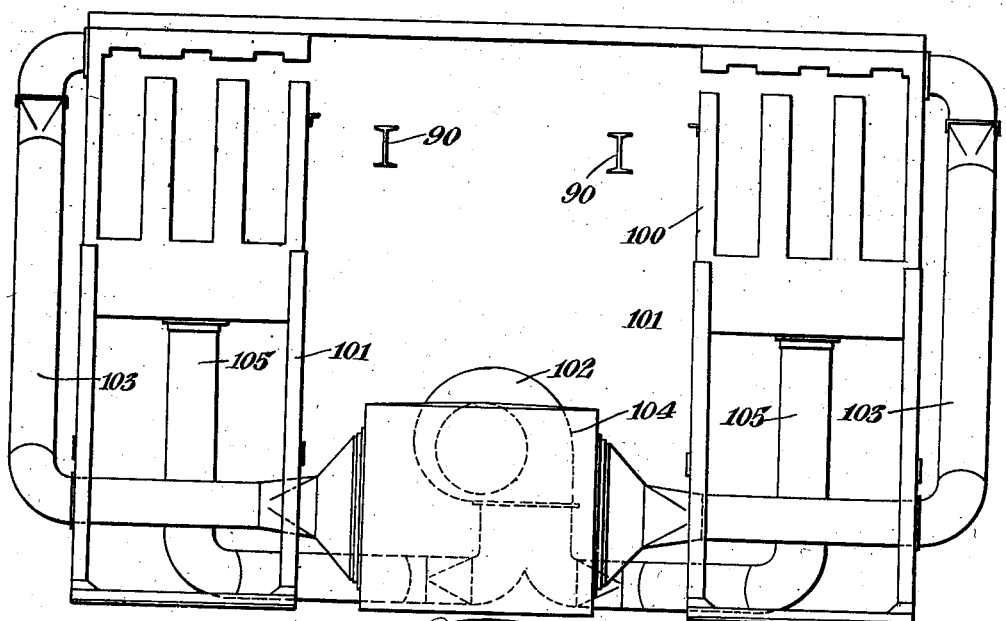
Fig. 11 is a diagrammatic elevation showing the arrangement of the drier chambers and conduits.
Figure 12:
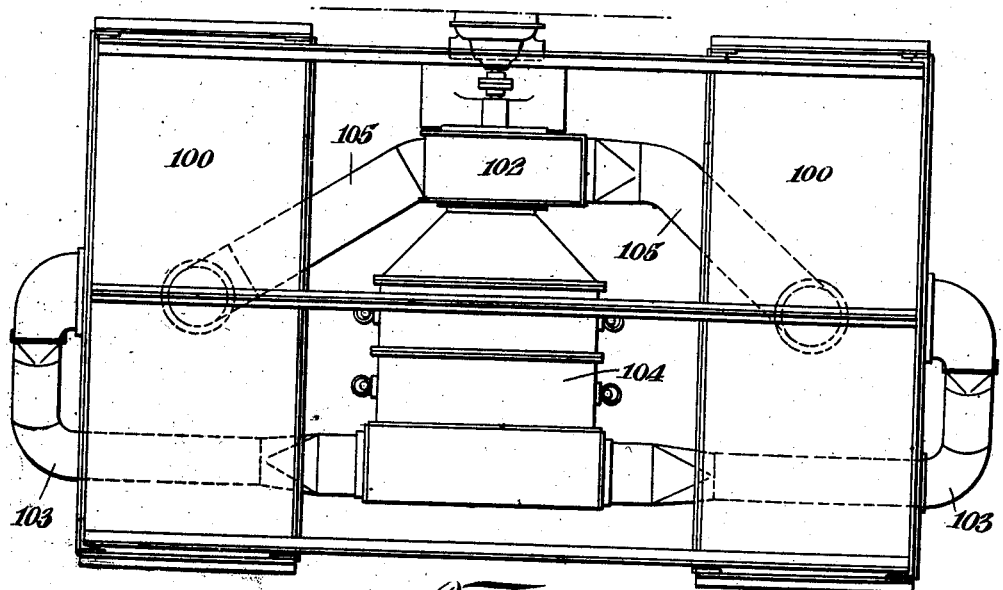
Fig. 12 is a plan view of the same.

At the other end of the machine the I beam members 90 are at a raised level and at their ends support the guides 69 attached at their upper ends to the cross member 98. This raised position of the discharge end brings the bars 30 into alinement with the lower level of the return chains 43, and also provides a large space for the drier. This drier (Figs. 11 and 12) comprises a sheet metal chamber 100 on each side shaped at each end (Fig. 11) to pass the bars and work, and supported by legs 101 at the bottom and the cross member 110 of the frame at the top. A fan 102 draws air from the top of these drier chambers through pipes 103 and heater 104 and forces the heated air through pipes 105 into the bottom of the chambers so that the work passing through in driers is in a continuous hot blast, fresh air being all the time intermixed through leakage at the ends and inner walls of the chambers.

After the drying the conveying means passes the bars to the unloading station B where the work is removed by hand or automatic removing means may be used, as for instance inclined strips or tracks aimed to engage the work and lift it from the carrier bars as they pass.

With the machine running as described, it will continue to pass the bars and its suspended work through the sequence of operations as above described, it being only necessary to load the bars and unload them unless an automatic unloading means has been provided. A bar 30 with this work may be fed to the machine at every tripping of the loading latch 32, or every other tripping, or every third tripping, as described, and where a single operator is both loading and unloading the bars at the end A, it may be desirable to thus retain the bar in position A for two intervals of tripping to give the operator plenty of time to load and unload the racks. In such case, the operator may be provided with hand operated means to hold the bar in loading position during every other tripping movement of the loading latch. The bars will then move through the machine in the same manner as above described except that there will be an empty interval between successive bars.

I claim:

1. In apparatus for treating articles in a series of fluids, the combination with a line of containers, a transverse carrier bar adapted to support the articles, continually operated means for conveying said bar along said containers so as to move said articles into and out of said containers in succession, and automatically operated means for temporarily arresting movement of said bar in loading or unloading position at one end of said line of containers, said automatically operated means being independent of said continually operated means.

2. In apparatus for treating articles in a series of fluids, the combination with a line of containers, a transverse carrier bar extending across said containers adapted to support the articles, means for conveying said bar along said containers so as to move said articles into and out of said containers in succession, and automatically operated means for temporarily arresting movement of said bar in loading and unloading position at one end of said line of containers, said automatically operated means being independent of said conveying means.

3. In apparatus for treating articles in a series of fluids, the combination with a line of containers, a transverse carrier bar adapted to support the articles, means for conveying said bar along said containers so as to move said articles into and out of said containers in succession, and automatically operated means for temporarily arresting movement of said bar in loading position at one end of said line of containers and temporarily arresting movement of said bar in unloading position at the other end of said line of containers, said automatically operated means being independent of said conveying means.

4. In apparatus for treating articles in a series of fluids the combination with a plurality of containers, of conveying means for the articles comprising a bar adapted to support said articles, automatically operated means for arresting movement of said bar in loading position at one end of said containers, and means for moving said bar along said containers so as to move the articles into and out of said containers in succession, the said automatically operated means being independent of the means for moving the bar.

5. In apparatus for treating articles in a series of fluids the combination with a plurality of containers, of conveying means for the articles comprising a bar adapted to support said articles, automatically operated means for arresting movement of said bar in loading position at one end of said containers, means for moving said bar along said containers so as to move the articles into and out of said containers in succession, and automatically operated means for arresting movement of said bar in unloading position at the other end of said containers, both of said automatically operated means being independent of the bar moving means.

6. In apparatus for treating articles in a series of fluids the combination with a plurality of containers, of conveying means for the articles comprising a bar adapted to support said articles, automatically operated means for arresting movement of said bar in loading position at one end of said containers, means for moving said bar along said containers, so as to move the articles into and out of said containers in succession, automatically operated means for arresting movement of said bar in unloading position at the other end of said containers, and means for automatically returning said bar to the loading position, both of said automatically operated means being independent of the bar moving means.

7. In apparatus for treating articles the combination with a supporting member for the articles to be treated, a container, conveying means for moving said support to position said articles in said container comprising a pivoted arm member engaging said support, another conveying means moving said support to carry said articles out of said container, and means for positively removing and longitudinally moving said support from one conveying means and positively inserting the same in contact with the second mentioned conveying means comprising an intermediate pivoted member.

8. In apparatus for treating articles the combination with a supporting member for the articles to be treated, a container, conveying means for moving said support to position said articles in said container comprising a pivoted arm member engaging said support, another conveying means moving said support to carry said articles out of said container, means for positively removing and longitudinally moving said support from one conveying means and positively inserting the same in contact with the second mentioned conveying means comprising an intermediate pivoted member, and means for driving all of said conveying means from a common driving means.

9. In apparatus for treating articles, the combination with a carrier bar for the articles to be treated, of a container, a pivoted arm engaging said carrier bar for positioning said articles in said container, a second pivoted arm for engaging said carrier bar for removing said articles from said container and a rotating means for moving said carrier bar along said container from the first mentioned pivoted arm to positive engagement with the second mentioned pivoted arm, the pivots of both of said arms and of said rotating means bearing a fixed relationship to each other and also to said container.

10. In apparatus for treating articles, the combination with a carrier bar for the articles to be treated, of a container, a pivoted arm engaging said carrier bar for positioning said articles in said container, a second pivoted arm for engaging said carrier bar for removing said articles from said container, a rotating spider for moving said carrier bar along said container from the first mentioned pivoted arm to positive engagement with the second mentioned pivoted arm, and, continuously operated means for returning said carrier bar from the second mentioned pivoted arm to the first mentioned pivoted arm.

11. In apparatus for treating articles, the combination with a carrier bar for the articles to be treated, of a container, a pivoted arm engaging said carrier bar for positioning said articles in said container, a second pivoted arm for engaging said carrier bar for removing said articles from said container, a rotating spider for moving said carrier bar along said container from the first mentioned pivoted arm to the second mentioned pivoted arm, continuously operated means for returning said carrier bar to the first mentioned pivoted arm, and automatically operated means temporarily arresting the movement of said carrier bar before delivering the same to said first mentioned pivoted arm, said automatically operated arresting means being independent of said continuously operated returning means.

12. In apparatus for treating articles the combination with a series of receptacles, of cross bar carriers extending transversely and movable longitudinally to carry articles through said receptacles, and means for moving said bars comprising supporting means extending longitudinally through said series of tanks and engaging said bars at the center portions thereof so as to leave each end of each bar free, said moving means acting to intermittently advance said bars rapidly at one point, slowly at another and permitting the bars to remain stationary at another point of travel.

13. In apparatus for treating articles the combination with a plurality of parallel series of tanks, of conveying means between the sides of said tanks having free ended carriers projecting outwardly in each direction toward the outer sides of said tanks and moving longitudinally to carry articles simultaneously in the same direction through said tanks in series, said conveying means receiving said articles at a loading station at one end, carrying them through said tanks on each side simultaneously and returning said articles to an unloading station at the same end so that a single operator loads and unloads said carriers.

14. In apparatus for treating articles the combination with a series of tanks with free access along their outer sides, of means for subjecting material to treatment in said tanks comprising conveying means acting to continuously support the articles and move them from tank to tank simultaneously in the same direction on each side and comprising carrying means progressively moving from one tank to another on each side with intermittent motion from entrance to discharge end and then returning from the discharge end to the entrance end to receive a new loading of said articles.

15. In apparatus for treating articles the combination with a series of tanks with free access along their outer sides, of means for subjecting material to treatment in said tanks comprising conveying means acting to continuously support the articles and move them from tank to tank simultaneously in the same direction on each side and comprising carrying means progressively moving from one tank to another on each side with intermittent motion from entrance to discharge end and then returning with continuous motion from the discharge end to the entrance end to receive a new loading of said articles.

16. In apparatus for treating articles the combination with a series of tanks with free access along their outer sides, of means for subjecting material to treatment in said tanks comprising conveying means acting to continuously support the articles and move them from tank to tank simultaneously in the same direction on each side and comprising carrying means progressively moving from one tank to another on each side with intermittent motion from entrance to discharge end and then returning with continuous motion at a relatively higher speed from the discharge end to the entrance end to receive a new loading of said articles.

17. In apparatus for treating articles the combination with a series of tanks with free access along their outer sides, of means for subjecting material to treatment in said tanks comprising conveying means adapted to continuously support the articles and move them in suspension and entirely immersed in liquids in said tanks, said conveying means progressively moving said articles simultaneously in the same direction on each side from one tank to the next at one rate of movement and then returning from the discharge to the entrance end at another higher rate of movement.

KURT T. POTTHOFF.